May 30, 1961 H. W. RICE 2,985,949

THERMOCOUPLES AND METHOD OF MAKING THE SAME

Filed Oct. 28, 1957 2 Sheets-Sheet 1

INVENTOR
Harold W. Rice

BY
Albert J. Henderson

ATTORNEY.

INVENTOR
Harold W. Rice

BY
Albert J. Henderson

ATTORNEY.

United States Patent Office 2,985,949

Patented May 30, 1961

2,985,949

THERMOCOUPLES AND METHOD OF MAKING THE SAME

Harold W. Rice, Playa Del Rey, Calif., assignor to Robertshaw-Fulton Controls Company, Richmond, Va., a corporation of Delaware Filed Oct. 28, 1957, Ser. No. 692,603

2 Claims. (Cl. 29—155.5)

This invention relates to thermocouples and the method of making the same.

Thermocouples may be composed of a pair of elements, such as wires, rods, plates and the like, having dissimilar thermoelectric characteristics, which elements are permanently joined at one of their ends to form a hot junction and the other ends are joined to an electric circuit to form a pair of cold junctions. Several thermocouples may be joined together and the end elements of the group may be connected to the electric circuit, in which case the group is commonly known as a thermopile.

Thermocouples are usually relatively expensive to construct and this is particularly true in the case of thermopiles. Also, the efficiency of thermocouples is impaired by the inadvertent heating of the cold junctions since the efficiency is proportional to the temperature difference between the hot and the cold junctions and cold junction heating tends to reduce the temperature differential.

Therefore, it is an object of this invention to construct thermocouples and thermopiles by a simple and relatively inexpensive process.

It is another object of this invention to minimize the effect of excess heat adjacent the cold junctions.

In the preferred embodiment of this invention, a pair of sheets of dissimilar material are provided with slits for the greater portion of their width to form a plurality of strips. The strips are joined and the slits are then extended for the whole width of said sheets to provide a series of alternate strips of dissimilar material.

The invention will be better understood by reference to the following detailed description taken in connection with the accompanying drawings wherein.

Figure 1:
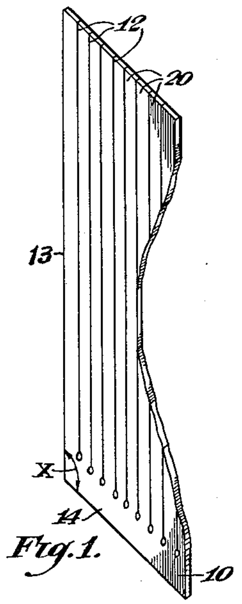
Fig. 1 is a perspective view of a portion of a continuous sheet with a plurality of slits therein.
Figure 2:
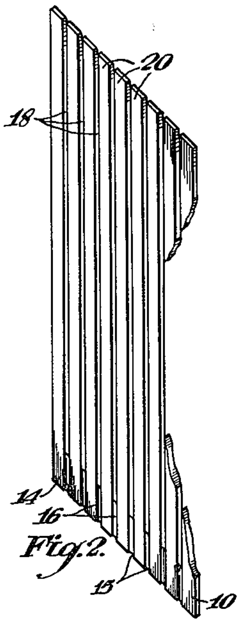
Fig. 2 is a view similar to Fig. 1 but with the unslit portions stretched.
Figures 7, 8, 9, 10, 11:
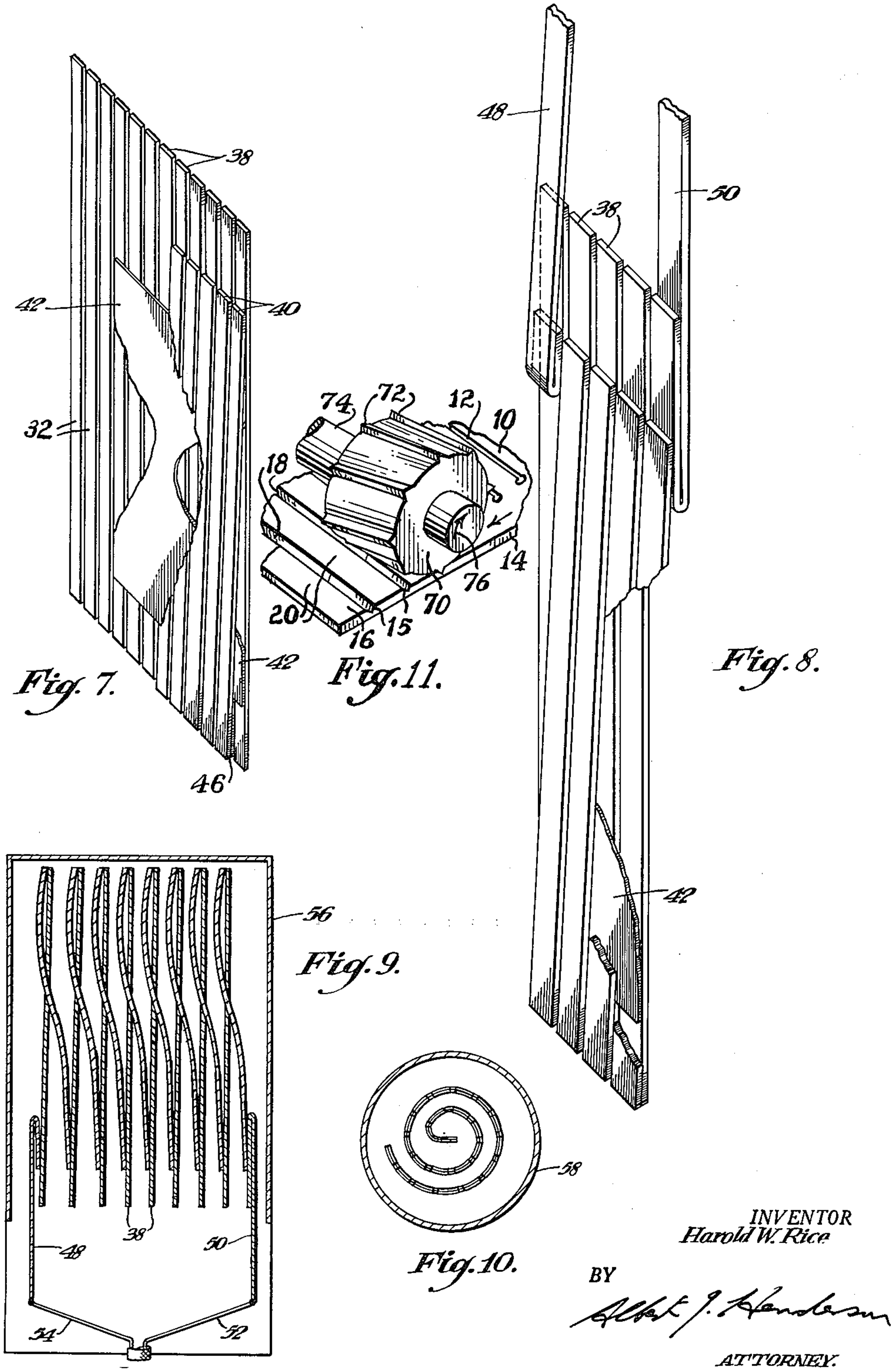
Fig. 7 is a view similar to Fig. 5 but with an insulation piece inserted.
Fig. 8 is a perspective view of the assembly with the end elements bent for connection to leads.
Fig. 9 is a longitudinal section view of a group of elements encased in a rectangular shell.
Fig. 10 is a plan view of another group of elements encased in a circular shell.
Fig. 11 is a perspective view of the serrated wheel stretching the unslit portions of a continuous sheet.

Referring more particularly to Fig. 1, a portion of a continuous sheet 10 of any suitable positive thermoelectric material is provided with a plurality of slits 12 which may be sheared, sawed, punched, or otherwise cut in the continuous sheet 10. The slits 12 are substantially parallel to the side 13 of sheet 10 and extend the greater portion of the width of sheet 10 to within a small distance of one end 14. As shown in Fig. 2, the unslit portions 16 are stretched at 15 by any suitable means, such as a serrated wheel, to give a slight separation 18 to the plurality of strips 20 for insulation purposes. As shown in Fig. 11, the unslit portion 16 is separated at 15. The separation is accomplished by a rolling operation of a serrated wheel 70 on sheet 10. Serrated wheel 70, having suitable outwardly projecting serrated portions 72, is mounted on driveshaft 74 and is rotated by a driving means (not shown) in the direction shown by arrow 76. The serrated portions 72 of serrated wheel 70 cooperate with any suitable die surface (not shown) abutting the underside of sheet 10 to compress the unslit portions 16 therebetween to obtain the slight separation 18 and form stretched portion 15 between strips 20. It is to be noted that sheet 10 can be fed into engagement with driven serrated wheel 70 or sheet 10 can be stationary with driven serrated wheel 70 passing over the surface of sheet 10.

Serrated portions 72 are designed to stretch the material only and will not sever stretched portions 15. Obviously, if sheet 10 has a substantial thickness, correspondingly stretched portions 15 can also be formed on the lower surface simultaneously with the formation of stretched portions 15 on the upper surface of sheet 10 by a second serrated wheel (not shown). By separating strips 20 a short distance, the heat transfer between adjacent strips is reduced. The stretched or unslit portions 16 are severed completely later as will become apparent hereinafter.

Figure 3:
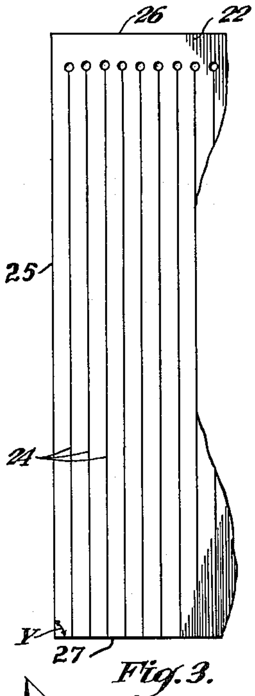
Fig. 3 is a front view of a portion of a second continuous sheet with a plurality of slits therein.
Figure 4:
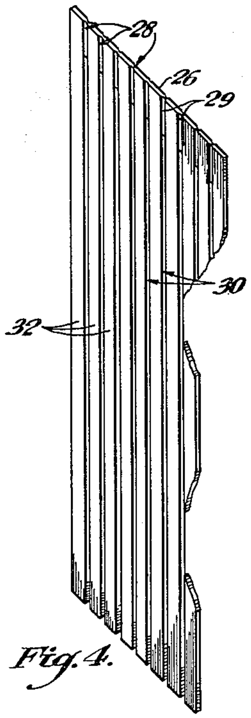
Fig. 4 is a perspective view of the second continuous sheet with the unslit portions stretched.

Referring more particularly to Figs. 3 and 4, a portion of a second continuous sheet 22 of any suitable negative thermoelectric material is provided with a plurality of slits 24 which may be sheared, sawed, punched, or otherwise cut in continuous sheet 22. The slits 24 are substantially parallel to the side 25 of sheet 22 and extend the greater portion of the sheet 22 to within a small distance of one end 26. As shown at 28, the unslit portions 29 are stretched by any suitable means, such as by a serrated wheel described above, to give a slight separation 30 to the plurality of strips 32 for the purpose of insulation.

Figure 5:
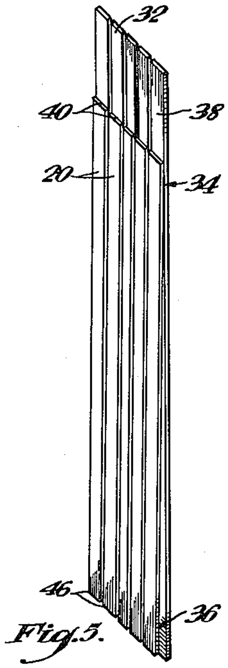
Fig. 5 is a perspective view of portions of the two continuous sheets in assembled position.
Figure 6:
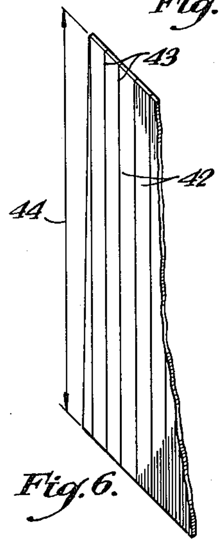
Fig. 6 is a perspective view of a scored insulation piece.

The sides 13 and 25 of the sheets 10 and 22 are cut so that the angles X and Y which are formed by the side 13 and end 14 of sheet 10 and the side 25 and end 27 of sheet 22, respectively, are dissimilar. The dissimilar angles X and Y are selected so that when the sheets 10 and 22 are placed together, one end portion of each positive strip 20 will be opposite an end portion of a negative strip 32 and the other end portion of each positive strip 20 will be opposite the end portion of the next negative strip 32 as shown in Figs. 5, 7, and 8. The opposed end portions of the positive strips 20 and the negative strips 32 are joined together in this staggered manner by any suitable means, such as seam welds 34 and 36. Now that the strips 20 and 32 are connected to each other, the slits 12 and 24 are extended the whole width of the sheets 10 and 22 along stretched portions 16 and 29 to completely sever any connection between like strips. As an alternate method, instead of being opposed, the ends 14 and 26 of sheets 10 and 22 may be joined so that a pair of positive elements and a pair of negative elements will be severed simultaneously on one stroke of a cutting instrument. The resulting structure, as shown in Fig. 5 is a continuous series of alternate strips having dissimilar thermoelectric characteristics.

One of the sheets 10 or 22 (illustrated herein as sheet 22), has a larger width than the other and, as a result, the negative strips 32 are longer than the positive strips 20. It should be understood that positive strips 20 may just as easily be constructed as the longer strips without changing the function. Due to the difference in size of the strips 20 and 32, the tips 38 of the negative strips 32 will extend beyond the cold junctions 40 which are formed when the strips 20 and 32 are connected. It has been found that the tips 38 have a cooling effect on the cold junctions 40 because much of the cold junction heat is dissipated through the tips 38. By making the tips 38 an appropriate length, the output of the thermogenerator has been increased as much as 17% over a similar thermogenerator without the heat dissipation tips 38.

A thermopile may be formed from the assembly since the desired number of thermocouples simply are counted and cut from the continuous assembly above described.

An insulation piece 42 of any suitable material, such as mica, glass cloth, or asbestos, and having a width 44 sufficient to reach between the hot junctions 46 and the cold junctions 40 may be inserted between the positive strips 20 and the negative strips 32 shown in Fig. 7, to lessen the heat transfer therebetween. The insulation piece 42 may be provided with scored lines 43 to facilitate the bending of the same. The end strips 48 and 50 of the desired number of thermocouples are then bent, as shown in Fig. 8, for connection to the electrical leads such as 52 and 54 (Fig. 9).

The thermopile may now be bent to any convenient shape, such as the spiral illustrated in Fig. 10, which is particularly advantageous because it occupies little space. The thermopile is then inserted in an appropriate rectangular shell 56 or circular shell 58 and is ready for use.

It is apparent from the above description that pile may be manufactured in long continuous strips by a simple process and with the elimination of scrap. It is also apparent that the use of heat dissipation tips will increase thermocouple efficiency.

While a specific embodiment of the invention has been shown, it is to be understood that changes in the construction and arrangement of steps may be made without departing from the scope of this invention which is defined by the appended claims.

I claim:

1. A method of constructing a thermopile from a pair of sheets of dissimilar thermoelectric material having equal widths which comprises, cutting each sheet separately to form substantially parallel slits in the greater portion of the width of each sheet to define a plurality of strips, said separate cutting of each sheet being adapted to define strips angularly displaced relative to one longitudinal edge of said one sheet and angularly displaced relative to the strips defined in said other sheet such that when the sheets are superimposed with the longitudinal edges and planes of each sheet parallel the end portions of the strips of each sheet are disposed opposite the unslit portion of the opposing sheet, stretching the unslit portion of each sheet substantially parallel to said one longitudinal edge by extending each slit the full width of its respective sheet for spacing adjacent strips, superimposing the pair of sheets and connecting together the respective end portions of the strips of one sheet to the respective oppositely disposed unslit portion of the other sheet, and cutting the stretched portion of the slits of each sheet the complete width thereof to thereby form a plurality of serially connected thermocouples.

2. A method of constructing a thermopile from a pair of sheets of dissimilar thermoelectric material having different widths which comprises cutting substantially parallel slits in the first of the sheets for the greater portion of the width thereof to form a plurality of equal width strips from the first material, cutting substantially parallel slits in the second and wider of the sheets for the greater portion of the width thereof to define strips displaced relative to one longitudinal edge of said second sheet so as to be angularly displaced relative to the strips defined in said first sheet when the longitudinal edges and planes of said first and second sheets are parallel, said strips being of equal width, the angle of displacement being such that when the sheets are superimposed, an end portion of each of the strips of the first sheet is opposite the unslit portion of the second sheet and the unslit portion of the first sheet is opposite the adjacent outer end portions of the strips of the second sheet, stretching the unslit portion of each sheet substantially parallel to said one longitudinal edge of said second sheet and the corresponding longitudinal edge of the first sheet by extending each slit the full width of its respective sheet for spacing adjacent strips, superimposing the pair of sheets and connecting together the unslit portions thereof to the strips oppositely disposed thereto, and cutting the stretched portions of the slits of each sheet the complete width thereof to thereby form a plurality of serially connected thermocouples having an extension thereon for the dissipation of heat.

References Cited in the file of this patent

UNITED STATES PATENTS

| | | |
|---|---|---|
| 1,618,743 | Adams | Feb. 22, 1927 |
| 1,741,870 | Mieville | Dec. 31, 1929 |
| 2,121,597 | Karl | June 21, 1938 |
| 2,137,538 | McIntosh | Nov. 22, 1938 |
| 2,457,616 | Van Dyke et al. | Dec. 28, 1948 |
| 2,674,641 | Holmes | Apr. 6, 1954 |

FOREIGN PATENTS

| | | |
|---|---|---|
| 604,799 | France | May 12, 1926 |